(12) United States Patent
Motzigkeit

(10) Patent No.: US 7,094,968 B2
(45) Date of Patent: Aug. 22, 2006

(54) FITTING FOR A LIQUID-TIGHT CABLE LEADTHROUGH

(75) Inventor: Daniel Motzigkeit, Hamburg (DE)

(73) Assignee: Airbus Deutschland GmbH, (DE)

( * ) Notice: Subject to any disclaimer, the term of this patent is extended or adjusted under 35 U.S.C. 154(b) by 0 days.

(21) Appl. No.: 11/206,628

(22) Filed: Aug. 18, 2005

(65) Prior Publication Data

US 2006/0063418 A1 Mar. 23, 2006

Related U.S. Application Data

(60) Provisional application No. 60/602,700, filed on Aug. 19, 2004.

(30) Foreign Application Priority Data

Aug. 19, 2004 (DE) ..................... 10 2004 040 293

(51) Int. Cl.
*H02G 15/04* (2006.01)
*F16L 5/02* (2006.01)

(52) U.S. Cl. ................ 174/65 G; 174/151; 174/153 G; 16/2.2

(58) Field of Classification Search ............ 174/48, 174/49, 53–55, 65 G, 65 R, 65 SS, 151, 174/152 G, 153 G; 16/2.1, 2.2; 248/56
See application file for complete search history.

(56) References Cited

U.S. PATENT DOCUMENTS

| 3,836,269 A | * | 9/1974 | Koscik ........................ 16/2.2 |
| 4,267,401 A | * | 5/1981 | Wilkinson .................. 174/151 |
| 4,572,923 A | | 2/1986 | Castellani et al. ............ 174/48 |
| 4,656,689 A | * | 4/1987 | Dennis ........................ 16/2.2 |

(Continued)

FOREIGN PATENT DOCUMENTS

DE 197 15 885 A1 10/1998

(Continued)

*Primary Examiner*—Dean A. Reichard
*Assistant Examiner*—Adolfo Nino
(74) *Attorney, Agent, or Firm*—Ostrolenk, Faber, Gerb & Soffen, LLP

(57) ABSTRACT

The invention relates to a fitting for a liquid-tight cable leadthrough in an opening (1) in a solid surface (2), which solid surface can be gripped from the back, wherein said fitting comprises an upper boundary plate (4) that covers the opening (1), an elastic moulded element (3) that flatly contacts and is connected to the upper boundary plate (4) and can be at least partially inserted into the opening (1), a lower boundary plate (8) that can be lead through the opening (1), wherein the lower boundary plate flatly contacts and is connected to the elastic moulded element (3) on the opposite side of the elastic moulded element (3) referred to the upper boundary plate (4), a locking plate (9) that can be moved relative to the lower boundary plate (8) and is providable with at least two pivoted locking elements (17), wherein said locking elements are supported between pairs of mounting limbs (20) by element of a bolt (22) and can be pivoted between a position in which the locking plate (9) can be lead through the opening (1) and a stopping position which they enables a gripping from the back of the solid surface (2), at least one clamping element for adjusting the spacing between the upper boundary plate (4) and the locking plate (9) against forces generated during a deformation of the elastic moulded element, and opening (10) that extends through the locking plate (9), the boundary plates (4, 8) and the elastic moulded element (3) and serves for accommodating a cable (7) to be lead through the solid surface (2).

14 Claims, 4 Drawing Sheets

U.S. PATENT DOCUMENTS

| | | | |
|---|---|---|---|
| 5,235,138 A * | 8/1993 | Shah et al. | 174/151 |
| 5,442,140 A * | 8/1995 | Mc Grane | 174/151 |
| 5,561,272 A * | 10/1996 | Kunze et al. | 174/151 |
| 5,659,924 A * | 8/1997 | Gildersleeve | 16/2.1 |
| 5,836,048 A * | 11/1998 | Rossman et al. | 16/2.2 |
| 6,150,608 A | 11/2000 | Wambeke et al. | 174/65 |
| 6,179,634 B1 * | 1/2001 | Hull et al. | 174/48 |
| 6,560,819 B1 * | 5/2003 | Mizuno et al. | 16/2.2 |
| 6,750,395 B1 * | 6/2004 | Stout et al. | 174/48 |
| 6,768,058 B1 * | 7/2004 | Pallapothu | 174/65 G |
| 7,015,394 B1 * | 3/2006 | Desard et al. | 174/151 |

FOREIGN PATENT DOCUMENTS

| | | |
|---|---|---|
| DE | 299 06 645 U1 | 9/2000 |

\* cited by examiner

FITTING FOR A LIQUID-TIGHT CABLE LEADTHROUGH

REFERENCE TO RELATED APPLICATIONS

This application claims the benefit of the filing date of U.S. Provisional Patent Application No. 60/602,700 filed Aug. 19, 2004, and of the German Patent Application No. 10 2004 040 293.0 filed Aug. 19, 2004 the disclosures of which are hereby incorporated herein by reference.

FIELD OF THE INVENTION

The invention relates to a fitting for a liquid-tight cable leadthrough in solid surfaces, which solid surface can be gripped from the back. In this context, the term solid surfaces refers, among other things, to various self-supporting wall structures, ceiling structures or floor structures, as well as other partitioning elements and boundary elements. The fittings according to the invention can be advantageously utilized in all instances, in which a cable leadthrough needs to be quickly installed and a sufficient sealing effect as well as an adequate strain relief needs to be ensured.

TECHNOLOGICAL BACKGROUND

Fittings of this type are used, for example, in the construction of aircraft, in which not only the fulfillment of stricter safety requirements is of the utmost importance, but also an effective weight reduction.

When installing cables in aircraft, the required cable lengths can sometimes be significantly reduced by installing such cable leadthroughs. However, the cable leadthrough mostly is also subject to strict requirements.

In addition to the installation of various cables in the vicinity the frame, the utilization of cable leadthroughs frequently makes it possible to realize new installation routes, which may require a modification of the cable mounting. A cable leadthrough frequently needs to fulfill the function of a mounting element for cables to be installed.

The requirements to be fulfilled by a cable leadthrough can be elucidated particularly well on the example of supply lines for appliances in on-board kitchens. Several on-board kitchens are typically arranged in central regions of the aircraft fuselage. Since kitchen supply cables have a comparatively large conductor cross section due to high supply currents, it is common practice to realize such kitchen supply cables in the form of a bunched adapter cable. Such adapter cables connect individual distribution panels to one another. One preferred location for accommodating central distribution panels is the region of the cross members in the interior of the fuselage. The on-board kitchens are equipped with a separate distribution panel. Such a distribution panel was usually arranged in the ceiling of the on-board kitchen until now in order to install all supply lines leading from the distribution panel to the individual kitchen appliances through the kitchen ceiling. This provides the advantage that the needed cable leadthroughs in the ceiling area are not affected by possibly spilled liquids in the kitchen area and that such liquids cannot reach the installation areas. Consequently, the risk of liquid-related short circuits can be maintained low. However, one significantly disadvantage of this installation principle can be seen in the long installation routes that sometimes need to be bridged between the central distribution panel and the kitchen distribution panel with heavy adapter cables. For example, if a central distribution panel is situated in the cross member region, above which a kitchen cell is arranged, the adapter cable needs to be installed from the central distribution panel to the outer wall of the fuselage, then, to a location above the ceiling of the kitchen, between the frames along the outer wall and then to the distribution panel above the ceiling of the kitchen cell. In case that the adapter cable has a weight between approximately 160 g and more than 300 g per meter, the required cable lengths have a significant weight. In case that the kitchen distribution panel would be arranged in the lower region of the kitchen cell, the utilization of a suitable cable leadthrough in the floor of the on-board kitchen would make it possible to significantly reduce the length of the adapter cables between the distribution panels and to simultaneously reduce the weight accordingly.

However, the design of the cable leadthrough needs to fulfill certain requirements in order to allow its utilization at such a sensitive location.

It should be possible to install the cable leadthrough in a relatively simple fashion, in particular it is of the utmost importance that individual cable components do not become damaged under any circumstances because the possible fire hazard associated with such damages represents a safety risk of the first order on board of aircraft. In addition, it must be securely prevented that liquids leaking through the opening in the floor of the kitchen that is used for installing the cable leadthrough. This aspect is also very important because on the one hand the handling of meals and beverages in the kitchen area increases the risk of spilling liquids, for example, as a result of turbulences. On the other hand, safety-relevant installations that are sensitive to liquids may be arranged directly underneath the on-board kitchen in the region of the cross members. It is absolutely imperative to protect such installations from being unintentionally affected by liquids. It also needs to be taken into account that the properties of the cable leadthrough may not vary, namely even under extreme accelerations for components of this type. For example, an effective strain relief needs to occasionally absorb forces in the region of the cable leadthrough that can amount to a multiple of the loads generated by the weight of the cable. Possibly separating objects should not be able to cause any changes in the seating of the installed cable. Abrupt loads during intense turbulences and possibly required emergency landings also may not affect the electrical installations because the full functionality of all important operating systems needs to be ensured, particularly in such instances. A cable leadthrough also may not impair the cleaning and maintenance of the aircraft.

There may be a need for a fitting that may realizing a liquid-tight cable leadthrough that only requires a low installation expenditure, may ensure a sufficient strain relief and/or may conform to the high safety standards in aircraft construction.

SUMMARY OF THE INVENTION

This or other needs may be met with a fitting with the characteristics of claim 1. Advantageous embodiments of the fitting according to the invention are disclosed in the dependent claims 2–14.

According to an exemplary embodiment a cable leadthrough that fulfills the initially described requirements may be realized with a fitting according to the invention for liquid-tight cable leadthroughs in solid surfaces, which solid surfaces can be gripped from the back ("hintergreifbare feste Fläche"). The fitting according to this exemplary embodiment may comprisea moulded element ("Formkörper") of an elastic material that at least almost completely fills out the opening in the solid surface provided for installing the respective cable, for example, a bore in the floor of an on-board kitchen. Openings for accommodating the cables may lead through the elastic moulded part. The elastic moulded part may have a cross section that approximately corresponds to the shape of the opening for installing the cable leadthrough. A particularly simple installation may be achieved if the cross section of the elastic moulded part is chosen such that a slight clearance for the installation of the cable leadthrough remains between the part of the moulded element situated in the opening and the wall of the opening. On its front faces, the elastic mounded element may be bordered by two solid plates. An upper end plate may completely cover the opening for the installation of the cable leadthrough and may have such dimensions that it can be supported on the edge of the opening. A lower end plate may have a cross section that is slightly smaller than the opening in the solid surface. This may make it possible that the lower end plate is moved into the opening when the elastic moulded element is deformed. It may be particularly advantageous to rigidly connect the end plates to the elastic moulded part.

A locking plate situated in front of the lower end plate may be connected to the upper end plate with the aid of a clamping element. One further exemplary embodiment of such clamping element comprises at least one screw that extends through the end plates, the elastic moulded element and the locking plate. The spacing between the upper end plate and the locking plate may be varied by tightening the screw. Thereby, the lower end plate may act as a spacer between the locking plate and the elastic moulded element which spacer needs to ensure the most uniform transmission of force possible into the elastic moulded element. As the spacing between the upper end plate and the locking plate may be reduced, the elastic moulded element may be compressed whereby its thickness may decrease and its cross section may increase. This may cause the underside of the elastic moulded element to be firmly pressed against the wall of the leadthrough opening. At the same time a pressure may be generated in the interior of the elastic moulded element which pressure may ensure a firm contact between the elastic moulded element and the cables leading through the elastic moulded element, as well as the clamping element, if applicable. Due to these measures, the elastic moulded element may produce an excellent seal relative to fluids butting against the cable leadthrough. The contact pressure producing the desired sealing effect may be easily adapted to the respective circumstances by choosing the relative change in thickness as well as the modulus of elasticity of the material for the elastic moulded element accordingly.

The locking plate may have such dimensions that it can be easily inserted through the cable leadthrough opening. Pivotable locking elements may be arranged on its outer edges. These locking elements may be pivoted between at least two positions, wherein one position may lead to a positioning of the pivotable locking elements, which positioning does not obstruct the insertion of the locking plate through the cable leadthrough opening, and wherein the other position of the locking elements may be defined by a limit stop in such a way that the pivotable locking elements may grip the solid surface, containing the cable leadthrough opening, from the back. Consequently, an end stop that limits the deformation of the elastic moulded element may be realized when the clamping element may be tightened and the spacing between the locking plate and the upper end plate may be correspondingly reduced. This may securely obviates that a to high contact pressure relative to the lead-through cable may accidentally set, which may contribute to the increase of the installation security. In case that the clamping element provided may be tightened more than it is designed for reaching of the maximum deformation of the elastic moulded element additionally generated forces may be directly transmitted into the solid surface containing the cable leadthrough opening via the upper end plate and the pivoted locking elements that may be situated in the stopping position. This may make it possible to fix the entire fitting in the leadthrough opening much more solidly than it would be possible by utilizing a contact pressure that can be withstood by the lead-through cables.

A combination of a positive and a non-positive mounting principle may be realized with the fitting according to an exemplary embodiment of the invention. The cables may be held in the elastic moulded element in an exclusively non-positive fashion, which, due to the relatively large contact surface between the cables and the moulded element, may ensure that the cables may be fixed in position very carefully even if the holding forces provided are relatively high. An effective strain relief may be realized with the cable leadthrough in this fashion.

The fitting for the cable leadthrough may be mounted in the leadthrough opening, wherein an combination of a non-positive and a positive mounting principle may be employed. The stability of the non-positive connection may be defined by the modulus of elasticity and the geometry of the elastic moulded element in relation to the opening for the installation of the cable leadthrough, as well as the position of the limit stop formed by the pivoted locking elements. Clamping forces higher than those required for reaching the limit stop of the locking plate may result in a high positional stability of the fitting according to the invention, which fitting may be additionally secured from falling out of the leadthrough opening by a positive connection. Due to these measures, the positional stability of the fitting may be obtainable which stability may be substantially limited only by the resistance to fracture of the pivoted locking elements and their mounting on the locking plate. Thus, the cable leadthrough may be able to withstand high forces and, due to its construction, simultaneously may shield the region in which the cable may be actually fixed from external influences such as, for example, falling objects or other shocks that could impair the sealing effect.

An embodiment of a fitting according to the invention is described in greater detail below.

DESCRIPTION OF PREFERRED
EMBODIMENTS OF THE INVENTION

Figure 1:
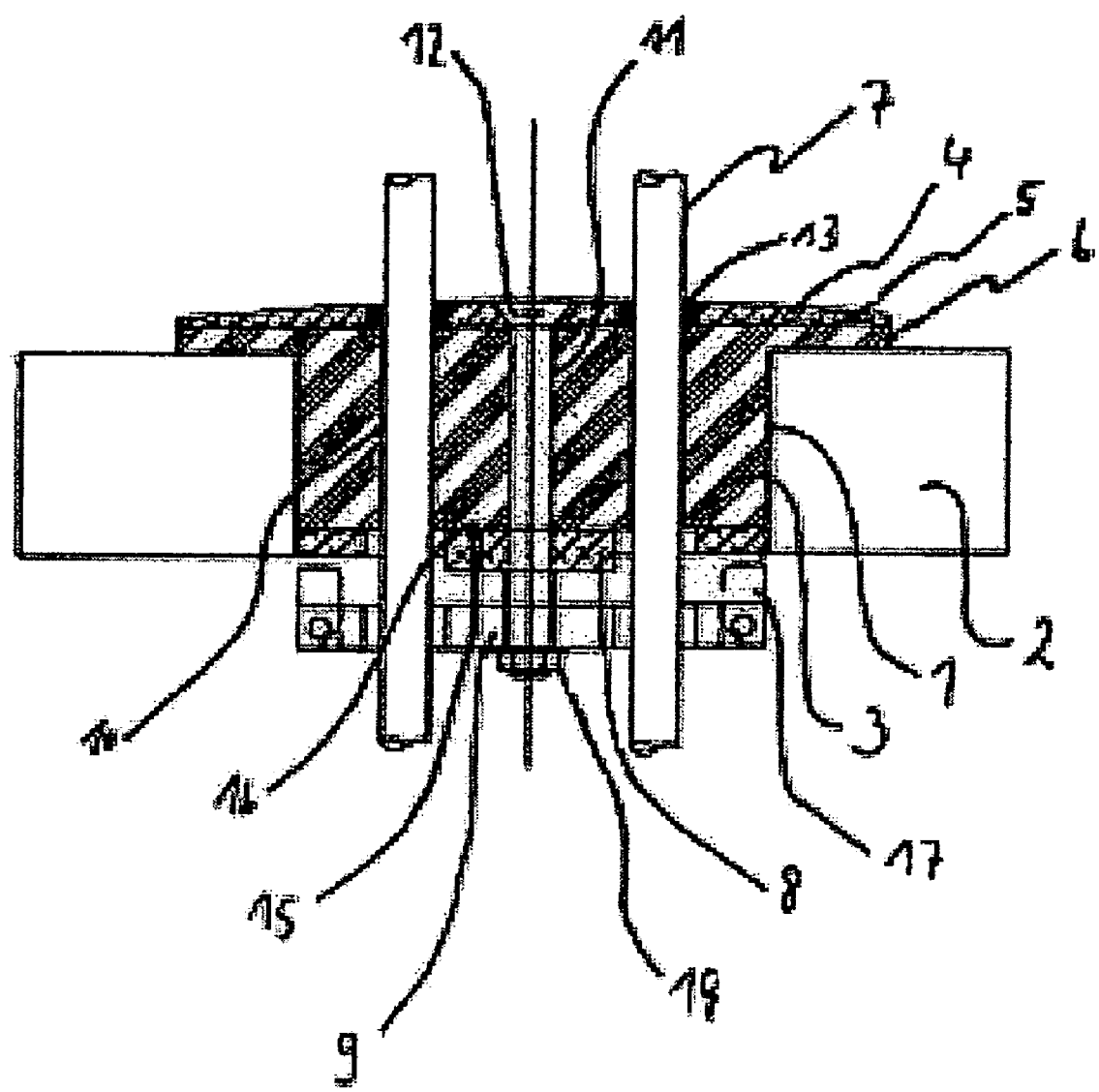
FIGS. 1–3 show such a fitting during three successive phases of the installation.

FIG. 1 shows an uninstalled fitting according to the invention that, which is completely inserted into an opening 1 for installing a cable leadthrough in a solid surface 2, which solid surface can be gripped from the back. The opening 1 is realized in the form of a bore in the floor of an on-board kitchen in an aircraft. A largely cylindrical rubber block 3, as an elastic moulded element, is connected with a circular upper boundary plate 4 by vulcanization. The diameter of the section of the rubber block 3 that extends into the bore 1 in the floor of the kitchen is slightly smaller than the diameter of the opening 1. The upper boundary plate 4 has a diameter that is significantly larger than the leadthrough opening 1. Consequently, the edge region of the circular upper boundary plate 4 forms a peripheral support region 5, in which the upper boundary plate 4 can be pressed against the floor. In the contact region with the upper boundary plate 4, the rubber block 3 contains a widening 6 that, in form of an elastic shim, produces the contact between the upper end plate 4 and the floor surface containing the opening. Due to these measures, the fitting is already well protected from sliding during the installation, and the cables 7, which has to be installed, are protected from being twisted during mounting of the fitting. A lower boundary plate 8 is situated on the underside of the rubber block 3 and is also firmly connected to the rubber block 3. The mounting of the two boundary plates 4, 8 to the rubber block can, among other things, be carried out by means of vulcanizing or bonding. In front of the lower boundary plate 8 a locking plate 9 is situated. Laterally of the axis of symmetry, the arrangement consisting of the rubber block 3 connected to the boundary plates 4, 8 and the locking plate 9 contains through-openings 10 for accommodating the respective cables 7, as well as a central opening in the form of a bore 11 for a screw 12 that forms clamping element. The cables 7 are advantageously cast into the openings 10 in the region of the upper end plate 4 with the aid of a casting compound 13. Preferably, the head of the screw 12 can be countersunk into the upper boundary plate 4 such that the resulting surface of the fitting according to the invention can be easily cleaned. The central bore 11 in the locking plate 9 is provided with a female thread for the screw 12. Consequently, the spacing between the upper boundary plate 4 and the locking plate 9 can be reduced by tightening the screw 12. During this process, the lower boundary plate 8 acts as a spacer between the locking plate 9 and the elastic rubber block 3. Both boundary plates 4, 8 are realized massively. The lower boundary plate 8 has the same diameter as the section of the rubber block 3 to be inserted into the leadthrough opening 1 in the relaxed state. Thereby, the lower boundary plate 8 provides for a very uniform transmission of force into the elastic rubber block 3 when the locking plate 9 is pressed against the lower boundary plate 8 by tightening the screw 12. Thus simultaneously is prevented that individual regions of the rubber block 3 are subjected to a much more intense deformation than other regions. Accelerated aging of the rubber block 3 due to the excessive deformation of individual regions can be effectively prevented in this fashion. The elastic rubber block 3 is compressed when the spacing between the upper boundary plate 4 and the locking plate 9 is reduced, whereby the thickness of the rubber block decreases and its cross section increases. Therefore, its outer side is firmly pressed against the wall of the opening 1 in the floor. At the same time a pressure is generated in the interior of the elastic rubber block 3 which provides for a firmly contact between the rubber block 3 and the cables 7 lead trough the rubber block, as well as the screw 12 that acts as the clamping element. In this way, the elastic rubber block 3 forms a superior seal relative to fluids butting on the cable leadthrough, particularly liquids being accumulated in the kitchen. In the present embodiment the threaded end protruding from the locking plate 9 after the screw 12 is tightened is provided with a self-locking nut 14 whereby, also in case of severe vibrations, loosening of the screw 12 and thus falling apart of the entire arrangement is prevented. A guide pin 15 is arranged on the locking plate 9 and engages into a guide bore 16 in the lower boundary plate in order to prevent the locking plate 9 from turning when the screw 12 is tightened. The guide pin can be pressed into the rubber block 3 if the travel of the locking plate 9 during the tightening of the screw 12 is significantly larger than the thickness of the lower boundary plate 8 at the location of the guide bore 16.

In the present example, the two end plates 4, 8 are realized thicker in the central region than in the peripheral region which provides for a sufficient stability with a relatively low weight. The locking plate 9 has such dimensions allowing an easily insertion through the cable leadthrough opening 1. On the outer edges of the locking plate two pivotable locking elements 17 that are opposite of one another. These locking elements can be pivoted between two positions. In an upright position, the locking elements take a vertical position referred to the locking plate 9 which position does not obstruct the insertion through the bore 1 for the cable leadthrough. The other position is defined by a limit stop in such a way that the pivotable locking elements 17, when in a swivel out position, are gripping the solid surface 2 of the kitchen floor, in which the cable leadthrough is installed, from the back. Therefore, an end stop is realized when the screw 12 that acts as the clamping element is tightened and thus the spacing between the locking plate 9 and the upper end plate 4 is reduced, wherein the end stop limits the deformation of the elastic rubber block 3. An embodiment of the cable leadthrough according to the invention that can be installed in a particularly stable fashion is realized if three or more pivotable locking elements are arranged on the edge of the locking plate in a star configuration.

The installation of the cable leadthrough preferably takes place by initially inserting the cables 7, which have to be lead through, into the corresponding openings 10 in the preassembled arrangement comprising the elastic rubber block 3, the boundary plates 4, 8 and the locking plate 9, i.e., the fitting according to the invention, and subsequently a displacement of the fitting along the cable 7 takes place until the entire fitting is inserted so far into the prepared cable leadthrough opening 1 that the upper end plate 4 lies flat on the edge of the opening 1. This is carried out while the pivotable locking elements 17 are in the vertical upright position. Thereby, the locking plate 9 has to take an position, by means of the screw 12, that the locking plate has the bore completely passed when the upper boundary plate 4 buts against the edge of the bore and that the boundary plate is arranged in a distance from the bore that allows a swiveling of the pivotable locking elements 17.

Figure 2:
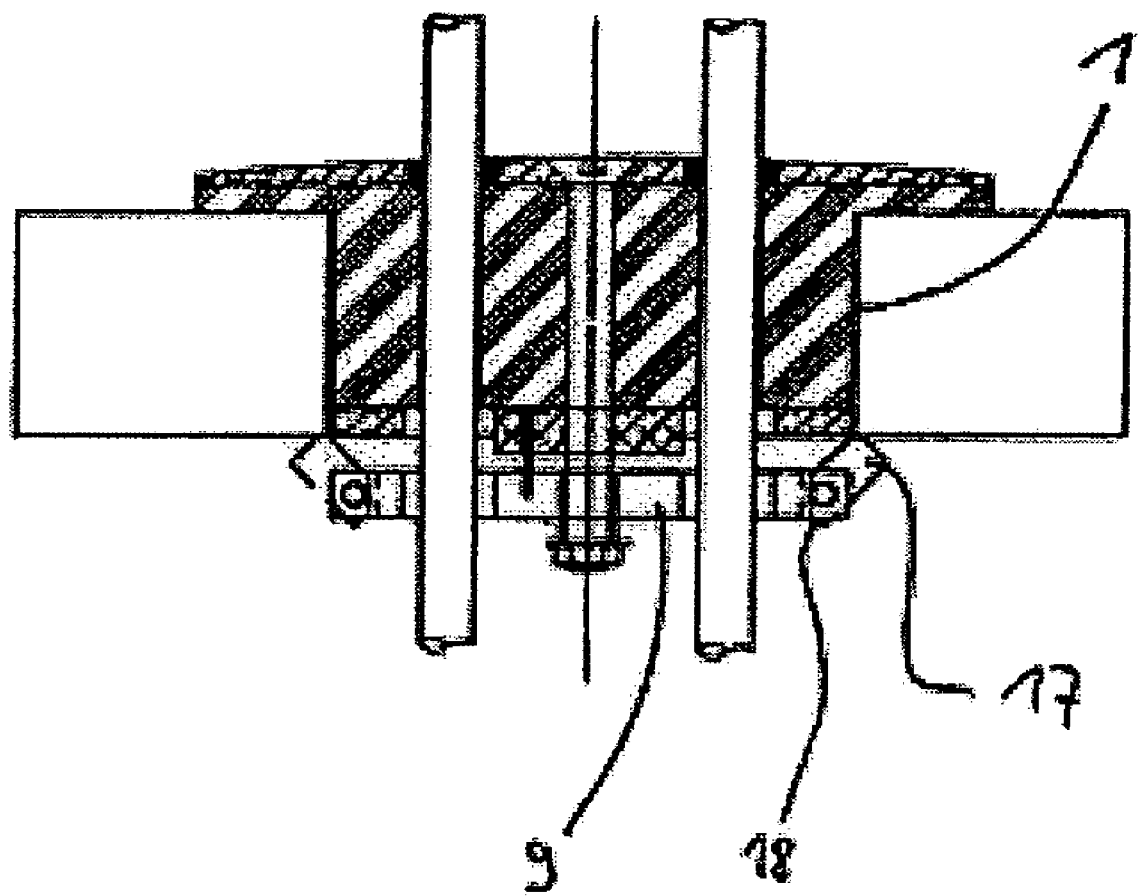

FIG. 2 shows a fitting according to the invention during the swivelling of the locking elements 17, forming a falling anchoring ("in Form einer fallenden Arretierung"), into the position that is defined by a limit stop 18 and in which the locking elements provides for a gripping from the back of the floor surface. The swivelling may take place, for example, by simply dropping after the fitting is slightly turned. In an embodiment that can be installed in a particularly simple fashion, the pivotable locking elements 17 are situated, always in the swivelled position ("abgeschwenkte Position"). Only when the fitting is lead through the bore 1 for the cable leadthrough, an erecting of the pivotable locking elements 17 takes place, against the force of a spring, in order to allow the insertion of the fitting. Once the locking plate 9 is sufficiently spaced apart from the underside of the floor surface after the insertion of the fitting, automatically an anew swiveling into the anchoring position takes place, under the influence of the spring force.

Figure 3:
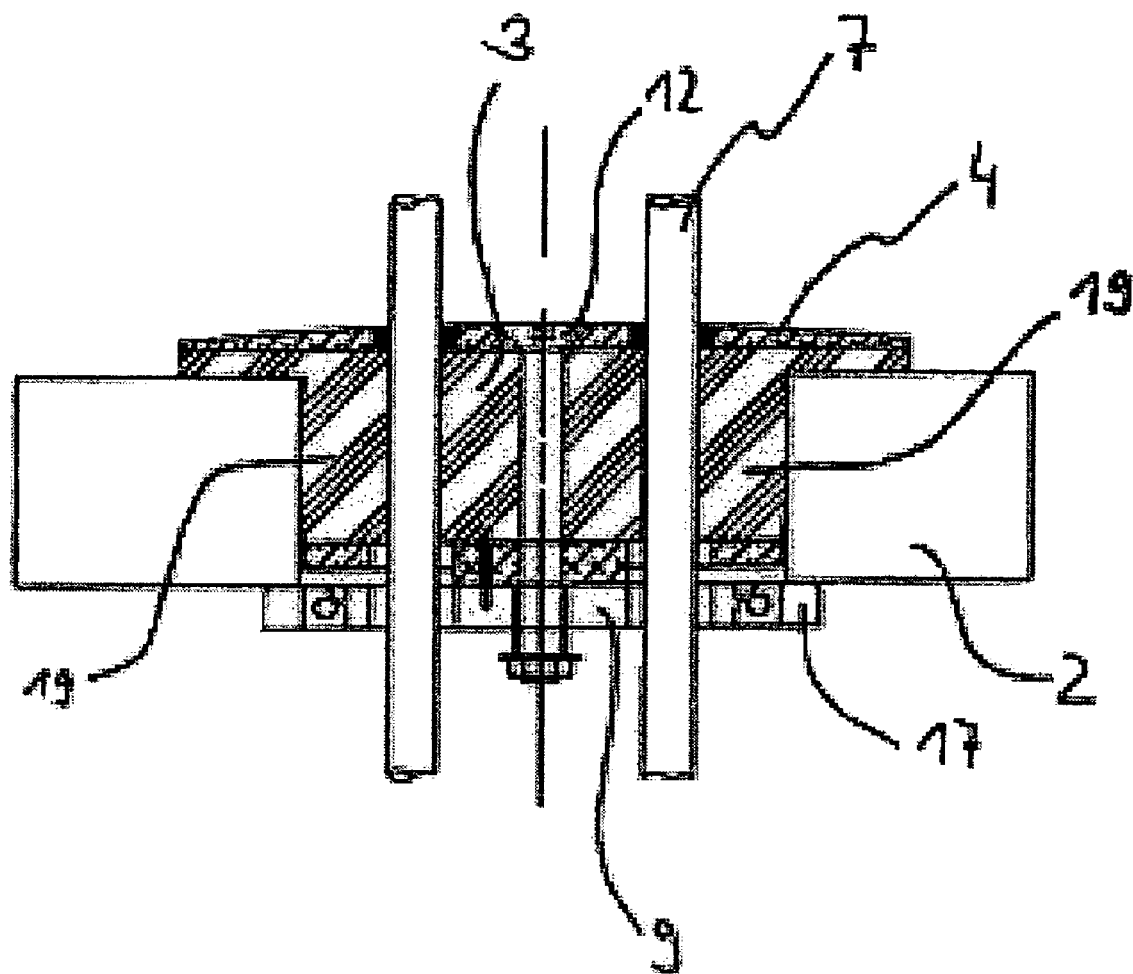

FIG. 3 shows a fitting according to the invention for a liquid-tight cable leadthrough in the installed state. The upper boundary plate 4 and the pivotable locking elements 17 arranged on the locking plate 9 are in firmly contact with the floor surface 2 of the kitchen. The cross section of the elastic rubber block 3 was increased by reducing the spacing between the upper boundary plate 4 and the locking plate 9 which is indicated in the form of a corresponding bulge 19. Consequently, its outer side is firmly pressed against the wall of the bore 1 in the floor. At the same time, a sufficient pressure exists in the interior of the elastic rubber block 3, which pressure provides for a firmly contact between the rubber block 3 and the cables 7 lead through the rubber block, and the screw 12 that serves as the clamping element, whereby the total cable leadthrough is liquid-tight.

Figure 4:
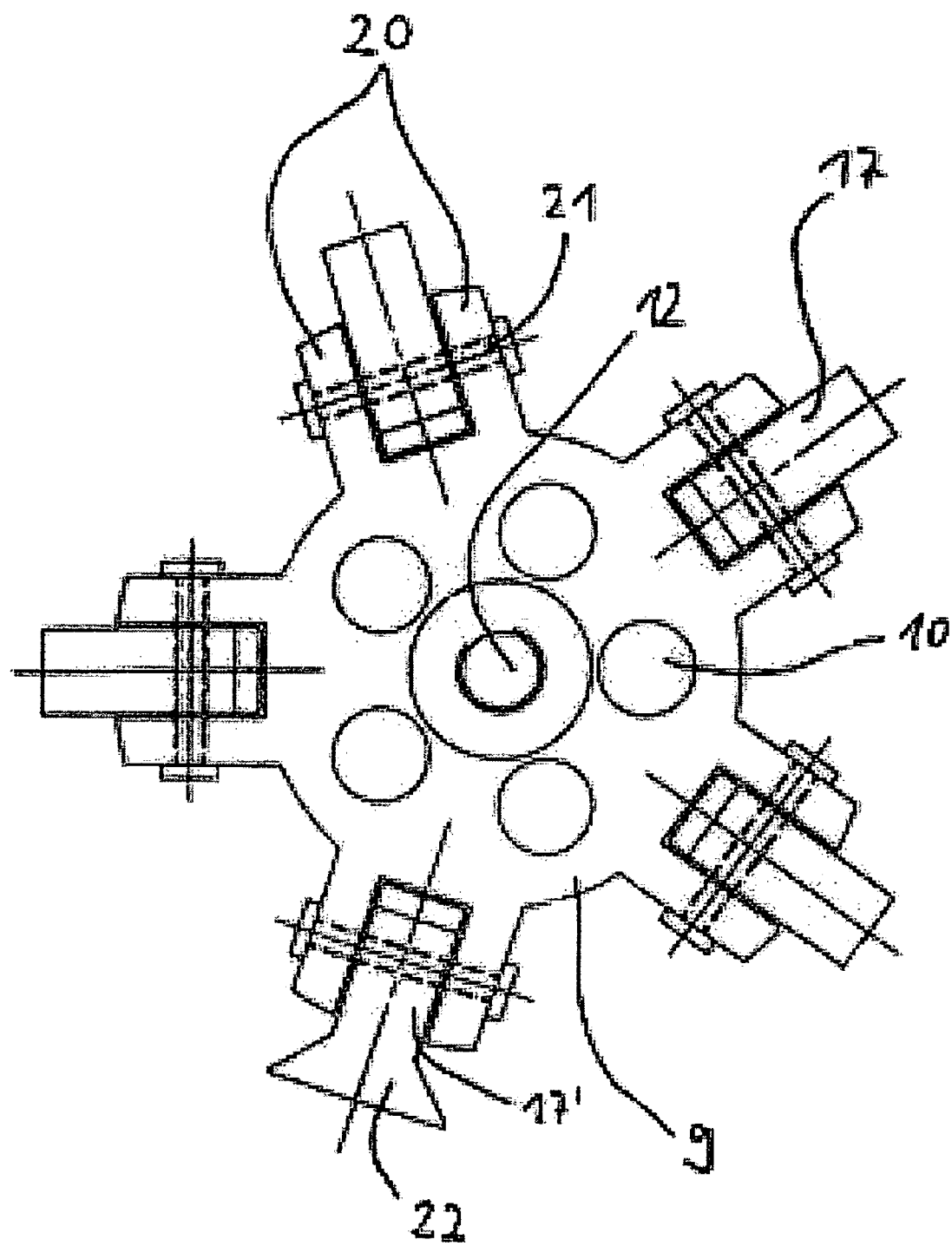
FIG. 4 shows a locking plate according to the invention with a star-shaped arrangement of five pivoted locking elements.

FIG. 4 shows the underside of a locking plate 9 according to the invention with five pivotable locking elements 17 arranged thereon in a star configuration and in a swiveled position. A particularly high stability of the completely installed cable leadthrough is achieved due to the symmetric arrangement and the larger number of pivotable locking elements 17. The locking plate 9 comprises a round central region, from which pairs of mounting limbs 20 protrude laterally which serves for fixing of the pivotable locking elements 17. The pivotable locking elements 17 are mounted on the locking plate 9 with the aid of one respective bolt 21 that extends through one pair of mounting limbs 20 and one corresponding pivotable locking element 17. The locking plate 9 shown forms part of a fitting according to the invention for realizing a liquid-tight cable leadthrough for five cables as indicated with bores 10 that are symmetrically arranged around the screw 12 provided with a self-locking nut. The pivotable locking elements 17 may be shaped in different ways. Parts of the locking elements 17 that come in contact with the back of the solid surface during the installation can be adapted in various ways to materials the solid surface consists of. For example, the pivotable locking element 17' has a significantly larger contact area 22 allowing for an installation of the fittig which installation is gentle to the material.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

What is claimed is:

1. A fitting for a liquid-tight cable leadthrough in an opening in a solid surface, which is gripped from the back, the fitting comprising:
   an upper boundary plate,
   an elastic moulded element,
   a lower boundary plate,
   a locking plate,
   at least one clamping element, and
   at least one opening for accommodating a cable to be lead through the solid surface,
   wherein the upper boundary plate covers the opening,
   wherein the elastic moulded element flatly contacts and is connected to the upper boundary plate and is at least partially inserted into the opening,
   wherein the lower boundary plate is lead through the opening, wherein the lower boundary plate flatly contacts and is connected to the elastic moulded element on the opposite side of the elastic moulded element referred to the upper boundary plate,
   wherein the locking plate is moved relative to the lower boundary plate and is provided with at least two pivotable locking elements, wherein said locking elements are mounted between pairs of mounting limbs by element of a bolt and is pivoted between a position in which the locking plate is lead through the opening and a stopping position which enables a gripping from the back of the solid surface,
   wherein the at least one clamping element is operable for adjusting the spacing between the upper boundary plate and the locking plate against forces generated during a deformation of the elastic moulded element,
   wherein the at least one opening for accommodating a cable to be lead through the solid surface extends through the locking plate, the boundary plates and the elastic moulded element and serves.

2. The fitting of claim 1, wherein the locking plate comprises at least three pivotable locking elements that are arranged in a star configuration.

3. The fitting of claim 1, wherein the locking plate contains five pivotable locking elements that are arranged in a star configuration.

4. The fitting of claim 1, wherein the elastic moulded element is a cylindrical rubber block that can be completely inserted into the opening in the solid surface which solid surface can be gripped from the back.

5. The fitting of claim 4, wherein the diameter of the cylindrical section of the rubber block is smaller in the relaxed state than the diameter of the opening in the solid surface which solid surface can be gripped from the back.

6. The fitting of claim 1, wherein the elastic moulded element is a rubber block with a cylindrical section that can be inserted into the opening in the solid surface, which solid surface can be gripped from the back, and with a widened section that is supported on the edge of the opening.

7. The fitting of claim 1, wherein several openings extending through the locking plate, the boundary plates and the elastic moulded element are provided for respectively accommodating a cable to be lead through the solid surface.

8. The fitting of claim 1, wherein five openings extending through the locking plate, the boundary plates and the elastic moulded element are provided for respectively accommodating a cable to be lead through the solid surface.

9. The fitting of claim 1, wherein the clamping element for adjusting the distance between the upper boundary plate and the locking plate comprises a screw that extends through a central opening in the locking plate, the boundary plates and the elastic moulded element.

10. The fitting of claim 9, wherein the screw is engaged with a female thread in the locking plate.

11. The fitting of claim 9, wherein the screw is secured with a self-locking nut.

12. The fitting of claim 1, wherein the locking plate is connected to a guide pin that can be moved in a guide bore in the lower boundary plate.

13. The fitting of claim 1, wherein the pivotable locking elements are supported in such a way that the stopping position of the pivotable locking elements, which stopping position enables that the solid surface can be gripped from the back, can only be vacated against an elastic restoring force.

14. The fitting of claim 1, wherein the openings for accommodating the cables to be lead trough have such dimensions in the region of the upper boundary plate that they are able to accommodate an casting compound volume required for sealing the lead through cables.

* * * * *